United States Patent Office 2,880,153
Patented Mar. 31, 1959

2,880,153

PHOTOPOLYMERIZATION PROCESS

Arnold A. Hiltz, Linwood, and Edward G. Lendrat, Narberth, Pa., assignors to American Viscose Corporation, Philadelphia, Pa., a corporation of Delaware No Drawing. Application January 28, 1957
Serial No. 636,517

17 Claims. (Cl. 204—158)

This invention is directed to an improved method of catalytically photopolymerizing ethylenically unsaturated compounds. The present application is a continuation-in-part of Serial No. 623,789, filed November 23, 1956, same inventors.

Many unsaturated monomers can be caused to polymerize by ultraviolet light, without the addition of any photosensitizing substance. The wavelength of the ultraviolet light required in most cases is, however, so short as to require the use of light sources and reaction vessels constructed of fused quartz or another substance transparent to short ultraviolet light, a grave disadvantage in practical commercial operations. Furthermore, the readily available means for producing short ultraviolet radiations (below 3000 Angstrom units) cheaply and with high intensity produce light of certain narrow wavelengths, as for example the mercury spectral line of wavelength at 2537 Angstrom units, and the available wavelengths may be so strongly absorbed by the polymerization system that they are capable of penetrating and affecting only a thin layer of material at the surface upon which the light is incident. For these and other reasons it is an object of this invention to devise a process wherein small amounts of photosensitizers are added to polymerizable monomers, and the latter are then polymerized by the action of light of longer wavelengths, which can be produced and applied more cheaply and conveniently. Photosensitizers are substances capable of absorbing light of wavelengths longer than those required for polymerization of the monomer alone and, under the action of the absorbed light, undergoing some chemical change whereby they become active initiators of the polymerization of the monomer.

Examples of the use of photoinitiators in photopolymerization have been described in the literature. For instance, methyl methacrylate containing lauroyl peroxide and benzoin (as light absorber) was polymerized with visible light (U.S. Patent No. 2,367,670). Diketones which absorb ultraviolet light and which do not contain inhibiting groups are also effective photosensitizers of methacrylic esters (U.S. Patent No. 2,367,660). A number of azo catalysts are also effective photoinitiators for the polymerization of vinyl monomers (U.S. Patent No. 2,471,959). In a recent patent (U.S. Patent No. 2,722,512), Crandall describes the photopolymerization of vinyl monomers with light of wavelength between 2500 and 7000 A., and alpha-substituted acyloins as photoinitiators.

It is the object of the present invention to provide means for effecting photosensitized photopolymerization by means of a sensitizer having wholly different chemical nature and solubility characteristics from those previously known in the art, which has particular applicability to aqueous polymerization systems, though not limited to such systems.

We have discovered that if a small amount of a soluble group VIII metal salt is added to a solution of a polymerizable unsaturated monomer in a suitably chosen solvent, and the solution is exposed to the light of a high-intensity incandescent lamp, polymerization rapidly ensues. In the preferred embodiments of our invention a small amount of an aqueous solution of an acid, preferably but not necessarily that acid whose anionic constituent is the same as the anion of the group VIII salt, is added to the reaction mixture, but such addition of acid is not essential to the accomplishment of our purpose. While the chloride and the nitrate are preferred we do not limit our assertion of photoinitiator activity to these specific salts of cobalt, nickel and iron since salts of other acids, both organic and inorganic, may also be used. These include the bromides, iodides, phosphates, acetates, formates, etc., preferably with the corresponding acid as stated above.

The photoinitiators previously known in the art have been organic compounds possessing little or no solubility in water, but the group VIII salts are typical water soluble inorganic compounds having little or no solubility in many organic solvents. Accordingly, these photoinitiators are especially suitable for photopolymerizations in water solution or in reaction mixtures containing considerable quantities of water. Their use is not, however, limited to aqueous media. Photopolymerizations with these salts have been carried out effectively in methanol, ethanol, n-propanol, isopropanol, glacial acetic acid, dioxane, acetone, dimethyl formamide, and dimethyl acetamide, as well as in mixtures of minor quantities of water with various organic solvents. They have also been carried out effectively in saturated aqueous zinc chloride. The polymerization does not, on the other hand, take place in dry benzene, toluene or other hydrocarbons or in other dry organic liquids of low polarity, presumably because the photosensitizers are incompatible with such solvents. In general an organic solvent, to be applicable to this process, should be of polar nature, as evidenced by relatively high dielectric constant, miscibility with water, or similar criteria. While it is a particular virtue of photopolymerizations that they can be caused to take place at room temperature or below, they are not limited to any particular temperature range. Photopolymerization with these sensitizers may be caused to take place at temperatures ranging from below 0° C., to above 100° C., but it is expected that their main utility will be realized in the range from above 0° C. to below 100° C., more particularly in the neighborhood of room temperature (25° C.).

The reaction vessels for the processes described in this invention can be transparent to light or opaque. If the vessel is transparent, an external light source can be used. If the vessel is opaque, there must be a light source inside the vessel. "Pyrex" glassware vessels are convenient for small scale use.

The range of wavelengths which are effective for the sensitized photopolymerization of this invention extends from about 3200 A., or below, to approximately 5000 A. For practical purposes radiation in the range from 3400 to 4500 A. is of greatest interest. When the wavelengths below 5000 A. are excluded by a filter, it has been found that very little photopolymerization takes place. A tungsten-filament projection lamp which emits only a minor fraction of its radiant energy below 5000 A. polymerizes these reaction mixtures readily. It is clear that for commercial use light sources of a sort which emit a larger fraction of their radiation in the effective wavelength range would be more efficient. Light absorption measurements reveal that the reaction mixtures absorb light very weakly in the wavelength range effective for polymerization. This is of practical importance in that it indicates that relatively thick layers of reaction mixture can be photopolymerized throughout, without serious attenuation of the effective radiation by the first thin layers of liquid upon which it is incident.

Since the rate of polymerization is proportional to the amount of photosensitizer present, it is desirable to use a quantity of the latter sufficient to produce a practical rate of polymerization. Consequently, amounts varying from 0.01 to 1.0% based on the weight of the total reaction mixture are preferred.

The photopolymerization process herein described gives colorless products and allows easy control of the polymerization even when large quantities of monomer are being polymerized.

The process takes place in the presence of atmospheric oxygen and hence the polymerization vessels and the polymerizable mixtures do not require flushing with an inert atmosphere.

For the reasons cited above, group VIII metal salts are especially suitable photosensitizers for photopolymerization of water-soluble monomers such as acrylamide and acrylonitrile. Their use is not, however, limited to these monomers but has been found applicable to every monomer which is readily polymerizable by the free-radical mechanism, and there is no reason to believe that the reaction is not general. In each case a proper monomer-solvent-sensitizer reaction mixture composition must be established empirically if one wishes to obtain rapid and effective polymerization. In the examples below are listed conditions for the photosensitized photopolymerization of acrylamide, using a catalyst concentration of 0.1% in all cases, based on the weight of reaction mixture. In place of acrylamide one may, as the preferred species, use either styrene, vinyl acetate, methyl acrylate, or methyl methacrylate, provided the solvent medium be changed to accommodate the changed monomer. Solvents exist for the effective polymerization of each of these monomers by the method of initiation herein described, but the choice of solvent is somewhat critical and is best made empirical once the monomer of interest has been selected.

*Example I*

Ferrous chloride was added to a solution of 40% acrylamide and 60% water. The resulting solution which was light brown in color was placed in a Pyrex vessel at room temperature and exposed to the light of a 1,000 watt tungsten projection lamp at a distance of about 7 inches from the reaction vessel for 10 minutes. The solution remained clear and formed no precipitate with methanol, indicating the absence of polymerization.

The reaction solution was then irradiated for an additional 10 minutes. The solution remained clear but a sample of the solution formed a slight precipitate in methanol, indicating slight polymerization.

Three drops of 0.4 N hydrochloric acid was then added to the solution and it was irradiated for an additional 10 minutes. The solution remained clear but became viscous, indicating the presence of polymer.

*Example II*

Nickel nitrate, $Ni(NO_3)_2.6H_2O$, was added to a 40% acrylamide-60% water solution and the mixture irradiated for 10 minutes. The solution remained clear and formed no precipitate in methanol.

The reaction mixture was then acidified with dilute nitric acid and irradiated for an additional 10 minutes. At the end of this time the solution remained clear but had turned to a stiff gel.

*Example III*

Nickel nitrate was added to a 40% acrylamide-60% water solution and acidified with dilute nitric acid. After irradiation for 10 minutes the solution remained clear but showed very slight turbidity in methanol.

The solution was then irradiated for an additional 10 minutes. It remained clear but became viscous.

*Example IV*

Nickel chloride was added to a solution of 40% acrylamide-60% water and the mixture irradiated for 10 minutes. The solution remained clear and formed no precipitate in methanol.

The reaction solution was acidified with dilute hydrochloric acid and irradiated for an additional 10 minutes. The solution remained clear but became viscous.

There are many purposes which may be served by effecting polymerization photochemically. While photochemical polymerizations are not limited to low temperatures, they can be carried out effectively at low temperatures because they are initiated by energy quanta from an outside source rather than by energy quanta derived from the thermal energy distribution of the polymerizing system. Chemical initiators of polymerization, which depend upon a thermal chemical reaction of the initiator, possess low temperature limits below which their action is so slow as not to be useful. Photochemical polymerizations are, in principle, free of such limitations.

Photochemical polymerization has also the advantage that it can be started by turning on a source of radiation, or by removing a radiation barrier interposed between a source of radiation and the polymerization system. Similarly it may be stopped by turning off the source of radiation or interposing the aforementioned radiation barrier, and its rate may be controlled by regulating the intensity of the source of radiation or regulating the degree of attenuation of the radiation by interposing screens or light filters between the radiation source and the polymerizing system.

It is obvious that the property of photopolymerizations that they may be started, stopped or modulated in rate by initiating, interrupting or modulating a stream of radiation may be utilized in various ways. As an example, in a continuous type of process a stream of polymerizable reaction mixture in which no polymerization has yet occurred may be caused to flow through a transparent reaction chamber to which radiation is applied, and therein to be polymerized. The extent and degree of polymerization may be controlled readily by variation of the intensity of spectral composition of the incident radiation, either by internal regulation of the source, by interposing light screens or filters, by varying the length or area of the reaction vessel upon which the radiation is permitted to fall, or by varying the rate of flow of the polymerizable mixture through the vessel. This same general type of control may be applied to the polymerization of a film of reaction mixture in the form of a surface coating upon an object or objects brought into the field of radiation in a controlled fashion. As an example, a moving belt may be coated with the polymerizable reaction mixture and caused to pass through a field of radiation wherein polymerization occurs, and the polymerized film thus formed may subsequently be removed from the moving belt and put to use as a self-supporting polymeric film. Alternatively the polymerizable reaction mixture may be applied to the surface of a web of fabric or other material, or to objects of various shapes and characters supported upon a moving belt, framework or other such device, and caused to pass through a field of radiation, wherein polymerization occurs and the film is converted into an adherent protective, decorative or otherwise useful surface coating upon the web or the objects aforementioned. These same objectives may, of course, be achieved in an alternative fashion of applying the polymerizable film to the belt, the web or the surface of various articles while the latter are stationary and shielded from photochemically active radiation, and subsequently exposing them to radiation. In either of these last cases it is possible to produce a design or pattern on the polymerized film or surface coating by interposing a light screen or filter, the attenuating action of which varies over its area in accordance with the desired spatial pattern.

It is a further advantage of photopolymerization that polymerization systems which require light for the initiation of polymerization can be prepared at one time or in one location, stored or transported in an unpolymerized condition, then polymerized at will in a controlled fashion, provided that they be protected from photochemically active radiation in such transportation or storage.

Various changes and modifications may be made in practicing the invention without departing from the spirit and scope thereof and, therefore, the invention is not to be limited except as defined in the appended claims. Thus, while the examples set forth above describe the preferred monomeric starting materials it should be emphasized that the process of this invention is particularly applicable to terminally unsaturated ethylenic compounds.

Specific terminally unsaturated compounds include acrylic, α-alkylacrylic, and α-chloroacrylic acid compounds such as esters, amides, and nitriles, e.g., acrylonitrile, methacrylonitrile, ethyl acrylate, isobutyl, methacrylate, methacrylamide, and methyl α-chloroacrylate; vinyl and vinylidene compounds such as vinyl and vinylidene esters, ethers and ketones, e.g., vinyl acetate, vinyl propionate, vinyl chloride, vinyl bromide, vinylidene chloride and bromide, divinyl formal, methyl vinyl ketone, vinyl ethyl- and vinyl methyl ether; and ethylenically substituted aromatic hydrocarbons, e.g., styrene, alkyl styrenes such as methyl styrene, etc.

We claim:

1. A process of polymerizing a vinyl monomer comprising photopolymerizing said monomer in the presence of a catalyst consisting essentially of a simple salt of a group VIII metal, said metal being present in a reduced valence state.

2. Process of claim 1 wherein the polymerization is conducted in an acidic environment.

3. A process of polymerizing a vinyl monomer comprising photopolymerizing said monomer in the presence of a catalyst consisting essentially of a simple salt of a metal selected from the group consisting of cobalt, iron and nickel in a reaction medium comprising a solvent selected from the group consisting of aqueous solutions and polar organic solutions, said metal being present in a reduced valence state.

4. Process of claim 3 wherein the vinyl monomer is acrylamide.

5. Process of claim 3 wherein the vinyl monomer is acrylonitrile.

6. Process of claim 3 wherein the vinyl monomer is vinyl acetate.

7. Process of claim 3 wherein the vinyl monomer is styrene.

8. Process of claim 3 wherein the vinyl monomer is methyl methacrylate.

9. An improved photopolymerization process comprising polymerizing a vinyl monomer in the presence of light and a catalyst consisting essentially of from about 0.01% to 1% by weight, based on the weight of said monomer, of a simple salt of a group VIII metal in a reaction medium comprising an acidified solvent for said salt, said metal being present in a reduced valence state.

10. Process of claim 9 wherein the salt is ferrous chloride.

11. Process of claim 9 wherein the salt is nickel nitrate.

12. Process of claim 9 wherein the salt is nickel chloride.

13. The process of claim 9 wherein the vinyl monomer is acrylamide.

14. The process of claim 9 wherein the vinyl monomer is acrylonitrile.

15. The process of claim 9 wherein the vinyl monomer is vinyl acetate.

16. The process of claim 9 wherein the vinyl monomer is styrene.

17. The process of claim 9 wherein the vinyl monomer is methyl methacrylate.

References Cited in the file of this patent
UNITED STATES PATENTS

| | | |
|---|---|---|
| 2,344,785 | Owens | Mar. 21, 1944 |

FOREIGN PATENTS

| | | |
|---|---|---|
| 455,742 | Great Britain | Oct. 27, 1936 |

OTHER REFERENCES

Oster: Photographic Engineering, vol. 4, No. 3, pages 176 and 178.

Ellis et al.: The Chemical Action of Ultraviolet Rays (New York, 1941), pp. 408–412.